United States Patent Office
3,419,525
Patented Dec. 31, 1968

3,419,525
CURING OF EPOXIES WITH AN AMINE-SUBSTITUTED ACID
David Aelony, Minneapolis, Minn., assignor to General Mills, Inc., a corporation of Delaware
No Drawing. Filed Jan. 17, 1967, Ser. No. 609,748
13 Claims. (Cl. 260—47)

ABSTRACT OF THE DISCLOSURE

Compositions comprising compounds of the formula

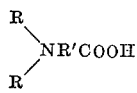

and epoxy resins. A representative compound is prepared by condensing dimethylamine with methyl acrylate and hydrolyzing the resulting product. The compounds react rapidly with the epoxy resins at elevated temperatures and yet are used to prepare mixtures or B-stage resins which are relatively stable at room temperature.

---

The present invention relates to compositions comprising epoxy resins and certain amine substituted acids.

Epoxy resins are known to produce a number of valuable products and, particularly in the coating arts, the epoxy resins are known to produce infusible, insoluble coatings or films which when properly cured exhibit desirable properties such as toughness, thermal stability and the like. The known curing agents for such epoxy resins, however, have been found to leave something to be desired. For example, the common aliphatic polyamines react rapidly at room temperature and at elevated temperatures with epoxy resins. They therefore possess poor storage stability. In addition, since most of the compounds of this class are liquids, they are difficult to utilize in powder systems. Other agents that have been utilized are the aminotriazines, anhydrides and aromatic diamines. These compounds, however, give moderate rates of reaction with epoxy resins at low and high temperatures and consequently cure rates are quite slow.

It is, therefore, an object of the instant invention to provide novel hardenable epoxy resin compositions.

Another object of the invention is to provide such compositions comprising certain amine substituted acids.

Still another object of the invention is to provide novel partially cured, hardenable compositions prepared from epoxy resins and certain amine substituted acids.

A further object of the invention is to provide novel infusible, insoluble products from epoxy resins and certain amine substituted acids.

Other and further objects, features and advantages of the present invention will become apparent to those skilled in the art from the following detailed disclosure thereof.

I have now discovered that certain amine substituted acids are unexpectedly good curing agents for epoxy resins. Thus said acids are compatible with epoxy resins and the resulting compositions are stable at room temperature. Additionally, the amine substituted acids can also be readily and easily reacted at elevated temperatures with the epoxy resins and the reaction can be terminated prior to completion to provide relatively stable, homogeneous B-stage resins of high utility. Such systems can be finely divided to provide stable, homogeneous powders for use in coating a variety of substrates by such methods as spraying and fluidization thereof. The admixtures or B-stage resins, even though stable at ambient room temperatures, are rapidly cured when heated to elevated temperatures. Still further, only small amounts of the amine substituted acids need be used in the compositions and very unexpectedly as the amount of the acid is reduced, the gel time is reduced.

The amine substituted acids employed in the present invention have the formula

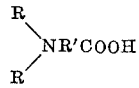

where R is an aliphatic radical of 1 to about 24 carbon atoms, or an aryl group which may or may not be substituted such as with aliphatic groups to give an alkaryl group, or an aralkyl group wherein the aryl group may or may not be substituted such as with additional aliphatic groups and R' is a straight or branched chain alkylene radical of from 2 to about 11 carbon atoms. It is preferred that R and R' are unsubstituted hydrocarbon radicals. The two R radicals may be the same or different.

The amine substituted acids may be prepared by known procedures. One preferred method is to condense a secondary amine and an alpha, beta unsaturated acid. Another preferred method is to condense the secondary amine with a lower aliphatic ester of an alpha, beta unsaturated acid. The resulting ester can be hydrolyzed to the acid in situ or subsequent to the condensation reaction. Representative aliphatic secondary amines used in such condensation reactions are dimethyl amine, diethyl amine, dipropyl amine, dibutyl amine, dipentyl amine, dihexyl amine, dicyclohexyl amine, diheptyl amine, dioctyl amine, dinonyl amine, didecyl amine, diundecyl amine, didodecyl amine, dihexadecyl amine, dioctadecyl amine, dihexenyl amine, diheptenyl amine, dioctenyl amine, dihexadecenyl amine, dioctadecenyl amine, distearyl amine, dioleyl amine, dioctynyl amine, dioctadecynyl amine and the like. Said amines may be branched chained amines. Representative side chain substituents are methyl, ethyl, propyl, butyl, pentyl, hexyl, hexenyl, heptyl, heptenyl, heptynyl, octyl, octenyl, decyl and the like. The amines may have one or more side chains, may be mono-, di- or tri-unsaturated, and may be substituted with inert or non-interfering groups such as chlorine, nitro and the like.

Representative aryl secondary amines are diphenylamine and the substituted derivatives thereof, including the dialkaryl amines. Such amines can be represented by the formula:

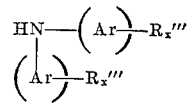

where Ar is the cyclic moiety, R''' is a substituent such as methyl, ethyl, propyl, butyl, pentyl, pentenyl, hexenyl, hexyl, 2-ethyl hexyl, hexynyl, octyl, decyl, decenyl, decynyl, and the like. Either the cyclic moiety or the substituent may contain inert or noninterfering groups such as halogen, nitro, and the like. The aryl or alkaryl radicals preferably contain from about 6 to 40 carbon atoms and it is preferred that the cyclic moiety contains no more than about 2 substituents. It is even more preferred that the cyclic moiety contains 1 or less substituents. $x$ in the above formula is an integer representing the number of aliphatic substituents on the cyclic moiety.

A representative aralkyl secondary amine is dibenzyl amine. Such amines can be represented by the formula

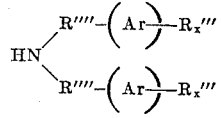

where R''' and $x$ have the meanings set forth above, $x$ preferably being 0 or 1 to about 4. R'''' is an alkylene radical which may be branched and preferably contains from about 1 to 10 carbon atoms. Either the cyclic moiety, R'''' or the substituent R''' may contain inert or non-interfering groups. The aralkyl radicals preferably contain from 7 to 40 carbon atoms and it is also preferred that the cyclic moiety contains less than two aliphatic substituents.

The preferred amines are the straight chain saturated aliphatic amines. The preferred acids are acrylic acid, methacrylic acid and crotonic acid. The preferred esters to be condensed with the said secondary amines are the esters of α,β-unsaturated acids such as the lower aliphatic esters (i.e., methyl, ethyl, propyl and the like) of acrylic acid, methacrylic acid and crotonic acid. Such condensation reaction can be illustrated as follows:

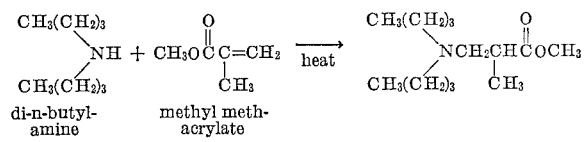

di-n-butyl-amine  methyl methacrylate

The ester is hydrolyzed to the acid

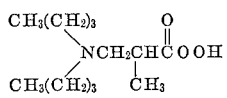

The condensation of the secondary amine and the ester is preferably carried out at temperatures of from about 10 to 120° C. At room temperature or lower the reaction requires a somewhat extended period of time. It is also preferred that such reaction be carried out in the presence of a lower aliphatic alcohol or 1,4-dioxane, the same accelerating the reaction. Representative alcohols are methanol, ethanol, isopropanol, secondary butanols and the like. Hydrolysis of the ester can be effected by water or aqueous alkali.

Another method of preparing the acids is by reductive amination of esters of aldehydic acids. This reaction can be illustrated as follows:

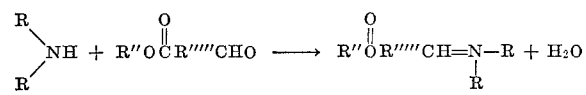

The resulting product is then hydrogenated to yield

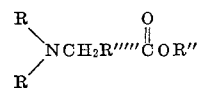

The ester is then hydrolyzed to the acid. The condensation and hydrogenation are preferably carried out in a single step. R'' represents a lower aliphatic radical and R''''' represents a divalent straight chain or branched chain alkylene group which preferably contains from 2 to about 10 carbon atoms. Said group may contain inert or noninterfering substituents.

Representative aldehydic esters for use in the above method are propyl succinaldehydate, isopropyl succinaldehydate, sec.-butyl succinaldehydate, tert.-butyl succinaldehydate, the corresponding propyl-, isopropyl-, sec.-butyl-, and tert.-butyl gluteraldehydates, adipaldehydates, pimelaldehydates, and sebacaldehydates and the corresponding esters of β-methylglutaraldehydic acid, γ,γ-dimethylglutaraldehydic acid, and the like. The useful amines are those described hereinabove. This reaction is preferably carried out at from 115 to 160° C., at a pressure of from 1 to 1000 atmospheres and in the presence of hydrogen and a hydrogenation catalyst.

The following specific description illustrates the preparation of amine substituted acids used in the present invention.

EXAMPLE A

To 132 ml. of a 40% by weight solution of dimethylamine in water was added 81 ml. methyl acrylate (cooled in ice water to a temperature of 5° C.). After thorough mixing (25 min.), the reaction mixture was refluxed for 2 hours and then allowed to stand overnight. It was evaporated in vacuum and when the residue became solid, it was dissolved in 200 ml. boiling methanol. The solution was cooled and then some of the solvent was evaporated. A precipitate formed which was separated and boiled in tetrahydrofuran. On cooling, the precipitate was separated. The original methanol liquor and the tetrahydrofuran liquor were combined and a precipitate formed. This precipitate was dried to yield 29.5 g. of β-dimethylaminopropionic acid having a nitrogen content of 11.7% and the formula

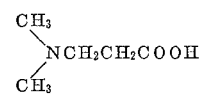

The following amine substituted acids are prepared in a similar manner from the reactants indicated in parentheses:

EXAMPLE B

β-Didecylaminopropionic acid (didodecylamine, methyl acrylate)

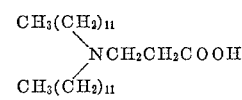

EXAMPLE C

β-Dioctadecylaminopropionic acid (dioctadecylamine, methyl acrylate)

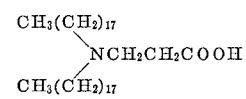

EXAMPLE D

β-Dibenzylaminopropionic acid (dibenzylamine, methyl acrylate)

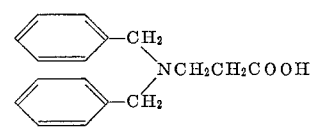

Any epoxy resin can be used in the present invention. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A,) the resin having the following theoretical structural formula:

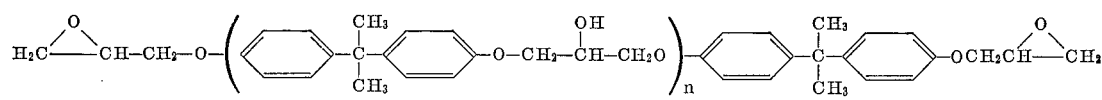

where n is 0 or an integer up to 10. Generally speaking, n will usually be no greater than 3 or 4, and may be 1 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

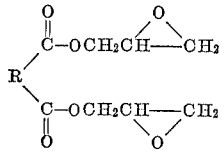

where R is the divalent hydrocarbon radical of dimerized unsaturated fatty acids.

The polymeric fat acids are well-known materials, commercially available, which are the products prepared from the polymerization of unsaturated fatty acids to provide a mixture of dibasic and higher polymeric fat acids. The polymeric fat acids are those resulting from the polymerization of the drying or semidrying oils or the free acids or the simple aliphatic alcohol esters of such acids. Suitable drying or semidrying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 6 to 22 carbon atoms. Illustrative thereof are oleic, linolenic, palmitoleic, and the like. Glycidyl esters of other polybasic acids, such as phthalic and sebacic acids, may be employed.

Other types of epoxy resins which may be used in the compositions of the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha,omega,omega-tetrakis(hydroxyphenyl) alkanes, such as 1,1,2,2-tetrakis(hydroxyphenyl)ethane, 1,1,4,4 - tetrakis(hydroxyphenyl)butane, 1,1,4,4 - tetrakis (hydroxyphenyl)-2-ethylbutane and the like. The epoxy resin reaction product of epichlorohydrin and tetraphenol may be represented by the following theoretical structural formula:

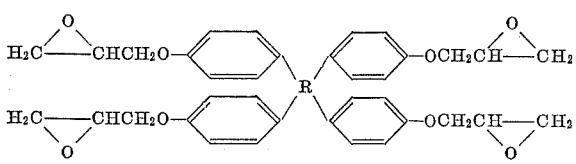

where R is a tetravalent aliphatic hydrocarbon chain having from 2 to 10, and preferably, from 2 to 6 carbon atoms.

Still another group of epoxide materials are the epoxidized novolac resins. Such resins are well-known substances and readily available commercially. The resins may be represented by the following theoretical, idealized formula:

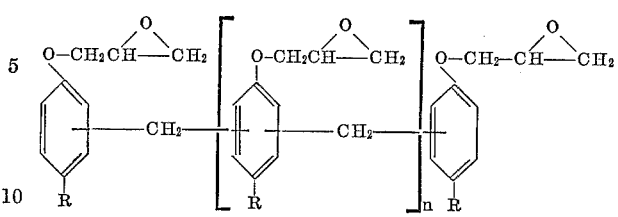

where R is selected from the group consisting of hydrogen and alkyl groups having up to 18 carbon atoms, and $n$ is an integer of from 1 to 10. Generally, $n$ will be an integer in excess of 1 to about 5.

In general, these resins are obtained by glycidification of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The glycidized novolac resin is formed in the well-known manner by adding the novolac resins to the epichlorohydrin and then adding an alkali metal hydroxide to the mixture so as to effect the desired condensation reaction.

In addition, other epoxy resins which may be used in the preparation of the compositions of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

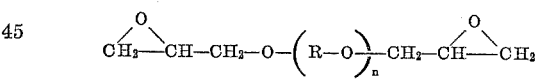

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups, or at least as having more than one epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The amine substituted acids are used in an amount sufficient to cure the epoxy resin to an insoluble and infusible polymer. Preferably, the amine substituted acids are used in ratios by weight curing agent to epoxy resin of from about 1:99 to 75:25.

As indicated previously, the present invention comprises curable compositions of the acids and epoxy resins, partially cured compositions of the acids and epoxy resins, and the ultimately prepared insoluble and infusible polymers prepared from the acids and epoxy resins. The curable compositions may be prepared simply by admixing the epoxy resin and the acid in the desired proportions. Such compositions are stable for extended periods of time at ambient room temperature and yet can be cured rapidly by heating to elevated temperatures. They may or may not be homogeneous.

The partially cured or B-stage resins may be prepared by admixing the acid and epoxy resin in the desired proportions, heating the reaction mixture to temperatures of about 30° C. to about 200° C., preferably 35° C. to 170° C., for a short period of time and terminating the reaction by cooling. By "B-stage" resin is meant a partially reacted product which will undergo little or no physical change during extended storage at ambient room temperatures and in which the reactants are homogeneously compatible in a one component, stable compound ready for final curing at elevated temperatures. In general, a "B-stage" resin will exist when the reaction is from about 5 to 90% complete.

The cured compositions of the present invention are prepared by heating the curable compositions or the partially cured compositions at elevated temperatures for a sufficient length of time to form insoluble and infusible polymers. Preferred heating temperatures are from about 300 to 450° F.

The amine substituted acid-epoxy resin compositions of my invention can also contain conventional additives such as pigments, fillers, flow control and anti-caking agents, accelerators, solvents and the like. In a preferred embodiment, the curable compositions or partially cured compositions are finely divided to form powders which find particular use in the coating of various substrates. Such powders give good edge coverage of sharp corners and thin panel edges. The B-stage powders are homogeneous, one-component materials which are stable at ambient room temperatures and yet can be rapidly cured at elevated temperatures. The same can be applied by the use of spray techniques or by forming a fluidized bed thereof. Normally the substrate to be coated is heated prior to being sprayed with the powder or being dipped into the fluidized bed. The powder then melts and coats the substrate. Subsequent curing, if necessary, can be in ovens heated to elevated temperatures. The powders of the present invention are especially valuable because of their quick cure characteristics.

The powders preferably contain flow control and anti-caking agents. Examples of such agents include amorphous silicas, dehydrated silica gels, various natural silicates such as attapulgite and kaolin clays, amorphous alumina, talc, and finely divided calcium carbonate. The described agents are preferably used in an amount sufficient to improve the flowout of the powder on melting with heat and/or to prevent fusing or caking of the powder at moderately high temperatures, i.e., 100–125° F. Obviously, the amounts of said agents can vary considerably, depending on the particular agent used and the result desired. Generally, said agents will be used in amounts of about 2 to 50% by weight based on the weight of the epoxy resin and the hydrazide.

The amine substituted acid-epoxy resin compositions, and particularly the coating powders derived therefrom, may also contain colorants, pigments, or fillers. Examples of suitable pigments include titanium dioxide (white finish), lead chromate (yellow), light and medium chrome yellow, chromium oxide (green), ultramarine blue, red iron oxide, and toluidine red. The amounts of said pigments can be varied widely to give different shades of different colors. Additionally, mixtures of different pigments may be used. Generally, said pigments are used in amounts of about 1 to 15% by weight based on the weight of the epoxy resin and hydrazide.

The amine substituted acid-epoxy resin compositions of this invention are useful not only in the coatings art but also in the preparation of laminates, moldings and the like. Preferred epoxy resins to be used are the glycidyl ethers of polyhydric phenols such as Bisphenol A.

The following specific description illustrates the amine substituted acid-epoxy resin compositions of the present invention.

EXAMPLE I

To 7.5 g. of epoxy resin (a condensation product of Bisphenol A and epichlorohydrin having an epoxy equivalent weight of about 177) was added 2.5 g. β-dimethylaminopropionic acid as prepared in Example A above. No reaction of the epoxy and acid was evident at room temperature. The mixture was slowly heated with stirring to 130° C. and upon reaching this temperature the reaction product (B-stage resin) was poured onto a Teflon sheet to cool. The cooled partially cured product was solid and homogeneous. Upon being subdivided and heated to 400° F., it gelled in nine minutes. The B-stage product has high utility. Thus a stable coating powder can be prepared from the partially cured resin and the same can be fluidized and applied to a heated substrate. The resulting film on the substrate gels quickly and is rapidly cured.

EXAMPLE II

Example I was repeated using 8.54 g. of the epoxy resin and 1.46 g. of the amine substituted acid. The gel time of the resulting B-stage resin was 8 minutes.

EXAMPLE III

Example I was repeated using 9.2 g. of the epoxy resin and 0.8 g. of the amine substituted acid. The gel time of the resulting B-stage resin was 1.5 minutes.

EXAMPLE IV

Example I was repeated using 9.2 g. of the epoxy resin and 0.4 g. of the amine substituted acid. The gel time of the resulting B-stage resin was 0.75 minutes.

The data of Examples I–IV show that the amine substituted acids are excellent curing agents for epoxy resins. Such data also show the entirely unexpected result that the compositions gel faster as the amount of curing agent is reduced.

EXAMPLES V–VII

Example I is repeated using the amine substituted acids of Examples B–D. Essentially the same results are obtained.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A curable composition comprising an epoxy resin having a plurality of 1,2-epoxide groups and an amine substituted acid of the formula:

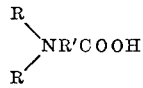

where R is selected from the group consisting of aliphatic radicals of 1 to about 24 carbon atoms, aryl and alkaryl radicals of 6 to about 40 carbon atoms and aralkyl radicals of 7 to about 40 carbon atoms and R' is an alkylene radical of 2 to about 11 carbon atoms, said acid being present in an amount sufficient to cure said epoxy resin to an infusible, insoluble polymer.

2. The composition of claim 1 where R' is ethylene.
3. The composition of claim 1 where R is methyl.
4. The composition of claim 1 where R is dodecyl.
5. The composition of claim 1 where R is octadecyl.
6. The composition of claim 1 where R is benzyl.

7. The composition of claim 1 where the epoxy resin has an epoxy equivalent weight of about 140 to about 2000.

8. The composition of claim 7 where the epoxy resin is a polyglycidyl ether of a polyhydric phenol.

9. A curable composition comprising the product prepared by reacting an epoxy resin having a plurality of 1,2-epoxide groups with an amine substituted acid of the formula:

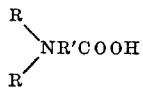

where R is selected from the group consisting of aliphatic radicals of 1 to about 24 carbon atoms, aryl and alkaryl radicals of 6 to about 40 carbon atoms and aralkyl radicals of 7 to about 40 carbon atoms and R' is an alkylene radical of 2 to about 11 carbon atoms, said acid being present in an amount sufficient to cure said epoxy resin to an infusible, insoluble polymer; and terminating the reaction by cooling when 5 to 90% complete.

10. The composition of claim 9 where R is methyl, R' is ethylene, the epoxy resin is a polyglycidyl ether of Bisphenol A and epichlorohydrin having an epoxy equivalent weight of about 177 and the weight ratio of acid to epoxy resin is in the range of 1:99 to 75:25.

11. The composition of claim 9 which is finely divided to form a powder.

12. The composition of claim 9 where R is an aliphatic hydrocarbon radical of 1 to about 24 carbon atoms.

13. An insoluble, infusible polymer prepared by heating the composition of claim 1.

References Cited

UNITED STATES PATENTS 3,154,598   10/1964   Vasta.

WILLIAM H. SHORT, *Primary Examiner.*

T. D. KERWIN, *Assistant Examiner.*

U.S. Cl. X.R.

260—2, 37, 49, 53, 56, 59, 78.4, 94.7, 404, 404.5, 471, 482, 518, 534; 117—161